(12) United States Patent
Mittricker et al.

(10) Patent No.: US 6,584,776 B2
(45) Date of Patent: Jul. 1, 2003

(54) METHOD FOR GENERATING POWER

(75) Inventors: Frank F. Mittricker, Houston, TX (US); Michael Turner, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/808,217

(22) Filed: Mar. 14, 2001

(65) Prior Publication Data

US 2002/0007624 A1 Jan. 24, 2002

Related U.S. Application Data

(60) Provisional application No. 60/190,621, filed on Mar. 20, 2000.

(51) Int. Cl.[7] ............................... F02C 3/30; F02C 7/10
(52) U.S. Cl. ...................................... 60/775; 60/39.511
(58) Field of Search ..................... 60/39.182, 39.511, 60/39.53, 775

(56) References Cited

U.S. PATENT DOCUMENTS 2,115,338 A * 4/1938 Lysholm .................. 60/39.182
2,678,532 A * 5/1954 Miller ..................... 60/39.182
5,181,376 A * 1/1993 Rao ........................ 60/39.182

FOREIGN PATENT DOCUMENTS

EP        0959235 A    11/1999

* cited by examiner

Primary Examiner—Louis J. Casaregola
(74) Attorney, Agent, or Firm—James A. Zboray; Lucinda Lomas

(57) ABSTRACT

A method and system for generating power include using a cogeneration power system having a gas turbine. The gas turbine has a compressor section for receiving air to be compressed. The compressed air is fed to a combustor section where it is mixed with fuel and the fuel is burned to produce heated combustion gas. The heated combustion gas is expanded in an expander section to generate shaft work which is used to drive a generator or alternator for producing electric power. The heated combustion gas leaves the expander as turbine exhaust which is cooled by transferring at least part of its heat to the air ahead of the combustor.

9 Claims, 1 Drawing Sheet

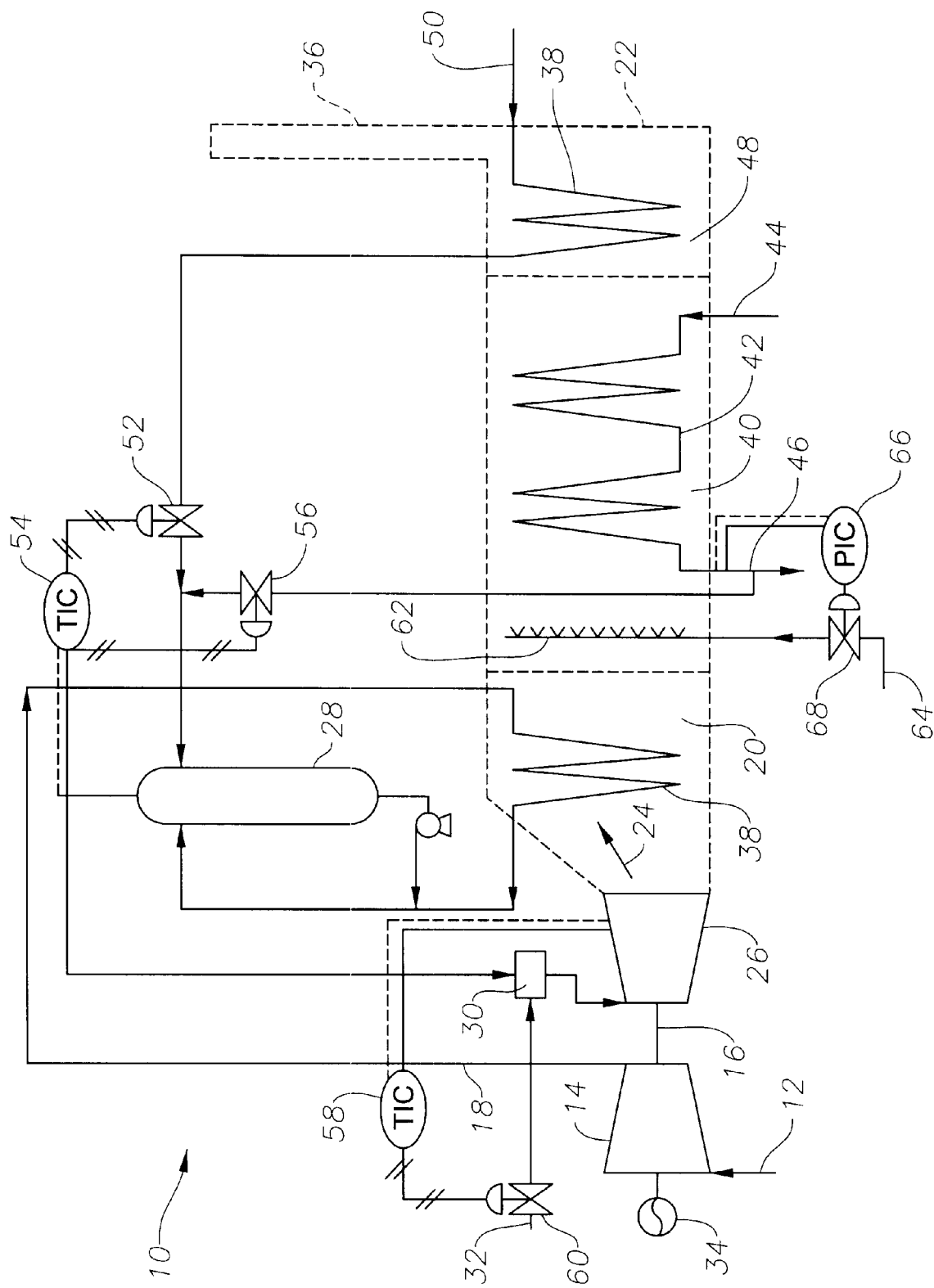

METHOD FOR GENERATING POWER

CROSS REFERENCE TO RELATED APPLICATION

Priority is claimed from copending U.S. provisional application No. 60/190,621, filed Mar. 20, 2000.

BACKGROUND OF THE INVENTION

Gas turbine power plants produce electric power by combusting fuel and compressed air in a combustion chamber and then using the resulting high temperature, high pressure combustion gas to rotate an expander which drives a generator to produce electric power. In general, these turbines include a compression section for compressing air entering the turbine, a combustion section following the compression section for combusting the fuel with compressed air, and an expansion section after the combustion section where the combustion gas from the combustion section is expanded to generate shaft work. The shaft work is transferred to an electrical generator that converts the shaft work into electricity.

Gas turbines operate based upon the Brayton cycle in three phases. First, work is performed on the air by compressing the air isentropically in the compression section. Heat is then added to the compressed air isobarically in the combustion section. The hot compressed air is then isentropically expanded down to a lower pressure in the expansion section. The Brayton cycle has inherent inefficiencies because much of the energy imparted to the air during the compression and heating remains in the relatively high temperature, low pressure exhaust gas exiting the expansion section. In many cases, the exhaust gas temperature may approach or exceed 1000 F. (538 Degrees C.). If vented to the atmosphere, the portion of the combustion fuel used to raise the exhaust gas to this temperature is wasted, resulting in poor overall cycle efficiency.

Recovering the remaining energy in the expander exhaust gas improves the overall efficiency of such plants. In one known approach, the expander exhaust gas is used to produce steam, which is then used to produce additional electric power in a condensing steam turbine. Thermodynamically, condensing steam to make power is inefficient because about two thirds of the energy is lost to cooling water in the condensing cycle and only about one third of the energy is converted to electricity. Because steam turbines operate on the Rankine cycle, and not the Brayton cycle, plants utilizing this heat recovery method are known as combined cycle plants.

Notwithstanding this loss of energy, the development of large advanced gas turbines has resulted in a substantial reduction in the capital investment required to install combined cycle power plants, and a significant increase in their efficiency. A useful measure of cycle efficiency is known as the heat rate, defined for combined cycle plants as the latent heat valve of the fuel consumed (BTU/H) divided by power produced (KW). Combined cycle plants using modern gas turbines can now produce power for less than 7000 BTU/KWH.

These advanced gas turbines use higher combustion temperatures and compression ratios to convert more of the combustion fuel directly to electric power in the expander. The amount of energy in the exhaust per unit of electric power produced by the expander is reduced, and hence the amount of energy lost to cooling water in the condensing steam turbine is also reduced. This translates to fuel savings and a lower heat rate. Advanced gas turbines also generate less exhaust gas per unit of power production at a higher exhaust temperature. Because the amount of exhaust gas is less and at higher temperature, a larger percentage of the exhaust energy can be recovered by the condensing steam turbine also leading to higher efficiency and a lower heat rate.

In a cogeneration power plant, the thermal energy of the expander exhaust is used to generate steam or some other heating medium such as hot oil, the net products being electric power and the cogenerated products (steam or another heating medium). The amount of thermal energy that can be absorbed by the steam generator or hot oil heater is referred to herein as the available heat sink. Large advanced gas turbines are often unsuitable in cogeneration applications because they require a very large available heat sink due to their large throughput and the high exhaust temperature.

For example, if the thermal energy load of the expander exhaust gas would generate more steam than is required for use elsewhere in the plant as a heating medium or otherwise, the exhaust energy load exceeds the available heat sink. Such limitations in the available heat sink may limit the size of the gas turbine in a cogeneration plant and prevent exploitation of the resulting economies of scale and efficiencies associated with larger turbines.

As a result, cogeneration power plants have become increasingly difficult to justify economically. Advances in gas turbines have made the difference in efficiency between combined cycle and cogeneration plants relatively small. The installation cost per kilowatt of a combined cycle plant is now considerably less than a cogeneration plant because of the economy of scale associated with the use of larger turbines in combined cycle plants.

With further advances in the size and efficiency of advanced gas turbines already on the horizon, a new heat recovery design is required to keep cogeneration plants viable, and to permit the efficient use of large gas turbines in cogeneration applications. Because cogeneration plants are more efficient than combined cycle plants and burn less fuel per kilowatt at a given turbine size, there are also environmental incentives for keeping cogeneration plants viable.

Conventional cogeneration power plants are also generally designed to be run base loaded, i.e., at their maximum fuel and air throughput. Turning down the plant from its base load reduces the efficiency of electric power production. However, because electric power prices fluctuate with market demand, it may be desirable to turn down the plant from based loaded when power prices are low. Accordingly, a method which allows a cogeneration power plant to be run efficiently in a turndown condition is also required.

On the other hand, cogeneration power plants typically have little additional electric power available when power demand and prices are high. A method which permits power production to be increased during peak periods is also required to enable cogeneration power plants to remain economically viable.

SUMMARY OF THE INVENTION

Accordingly, it is an object of the present invention to provide a method for recovering heat from the exhaust gas of a gas turbine and utilizing such recovery of heat to reduce the heat sink requirement of the turbine. Such method should allow for variations in both the heat load of the exhaust gas and the available heat sink associated with steam and other heating medium requirements elsewhere in the plant.

It is another object of the invention to provide a method of efficiently increasing the peak power capacity of the gas turbine plant while reducing the heat sink requirement.

It is another object of the invention to provide a heat recovery scheme that allows efficient turndown operation during periods of diminished electric power demand and less favorable market conditions.

Briefly, these and other objects are accomplished by the invention, which is directed to an efficient method and apparatus for generating power in a cogeneration gas turbine power plant that overcomes the limitations of using large advanced gas turbines in cogeneration applications. The invention utilizes direct heat recovery from high temperature expander exhaust gas to increase cycle efficiency and reduce the heat sink requirements for cogeneration applications, particularly those employing large gas turbines. In one operational mode, the method involves adding water to increase the mass flow through the expander in order to increase power production. In another mode, the method permits power production to be reduced without a substantial loss in efficiency. The method and apparatus of the invention provides increased flexibility of operation, thus permitting the efficient production of peaking power during periods of high demand when it is most economically attractive, while also allowing efficient power production in a turndown condition when power prices are low. Thus, the method allows power production and production of the cogenerated product to be continually optimized based on current power market conditions and plant steam, heating oil, or other heat requirements.

Contrary to previously known cogeneration plants in which the gas turbine size was limited by the available heat sink for the exhaust gas thermal load, the method of the invention allows the exhaust thermal load to exceed the available heat sink while utilizing the high temperature exhaust characteristics of advanced gas turbines to improve cycle efficiency. The high temperature exhaust preheats the air entering the combustor, and in an important aspect, preheats compressed air exiting an air compressor before the compressed air enters the combustor. Every unit of thermal energy exchanged between the expander exhaust and combustion air saves a unit of combustion fuel. About a third of the gas turbine exhaust energy can be directly recovered in this manner, depending on operating conditions and equipment design. This method of recovering thermal energy from the expander exhaust is much more efficient than in a combined cycle plant, where about two thirds of the exhaust energy is lost to cooling water in the steam condenser. The resulting cooled exhaust gas is still hot enough to produce a cogenerated product downstream to recover additional thermal energy. Because there is less thermal energy remaining in the cooled expander exhaust, the required heat sink is also significantly reduced compared to current cogeneration heat recovery schemes where all the exhaust energy is used to produce steam.

In an important aspect, the method of the invention also includes saturating the preheated combustion air with water prior to combustion to produce peaking power. Saturating the combustion air provides greater mass flow through the expander, and has the potential for increasing power production significantly during peak power periods. Saturation of the combustion air also lowers the combustion flame temperature, resulting in lower $NO_x$ gas emissions. Thermal energy in the expander exhaust gas can also be used to heat the water used in the saturator. Preheating the combustion air allows it to carry more water without undesirable condensing of water in the combustion chamber. Since the capital cost for this additional power is low compared to the cost of installing additional gas turbines to meet peak power requirements, the method provides additional revenues and economic incentives for installing a cogeneration plant.

Thus, the method and apparatus of the invention allows producers of electric power to circumvent previous heat sink limitations on gas turbine size in cogeneration plants and thereby achieve increased operating efficiency and economies of scale, while also permitting greater flexibility to adjust operations to maximize profitability in changing market conditions.

BRIEF DESCRIPTION OF THE DRAWING

FIG. 1 is a schematic diagram of a cogeneration power plant which includes the novel heat recovery and peak power generation methods of the invention.

DETAILED DESCRIPTION OF THE PREFERRED EMBODIMENT

Referring now to the drawing, the sole drawing FIGURE, FIG. 1, shows a schematic diagram of a cogeneration power plant embodying the present invention and generally identified by reference numeral 10. Ambient air 12 is provided to a compressor 14 of a gas turbine 16. The compressed air 18 is heated in a first section 20 of a heat recovery steam generator (HRSG) 22 by flowing through a bundle of finned tubes over which a hot exhaust gas 24 exiting an expander 26 flows. The finned tubes provide heat transfer surfaces for exchanging thermal energy from the expander exhaust gas 24 and into compressed air 18, thereby heating the compressed air 18 and cooling the exhaust gas 24. In one aspect of the invention, the heated compressed air 18 is introduced into a saturator drum 28 where, if desired, water is added to the air 18, preferably in the form of steam or a water mist, to increase the mass flow and hence the power output of the expander 26. This additional mass flow may increase power output up to 20% or more. The air exiting the saturator drum 28 is then heated in a combustor 30 by burning fuel 32. The fuel 32 may be a liquid or a gas, and is typically natural gas or distillate oil. The resulting combustion gas is then expanded in the expander 26 of the gas turbine 16, providing shaft work that drives a generator 34 to produce electric power.

The HRSG 22 receives exhaust gas 24 from the expander 26 of gas turbine 16 and discharges the exhaust gas to the atmosphere through a stack 36. Both economic and environmental incentives exist for removing as much of the exhaust heat as possible in the HRSG 22 before releasing the exhaust to the atmosphere. From an economic standpoint, every degree that the exhaust gas is above ambient temperature is a wasted unit of combustor fuel. Environmentally, recovering more energy from the exhaust gas permits the use of larger, more efficient gas turbines which generate lower amounts of greenhouse gases per unit of energy recovered.

The HRSG 22 may be comprised of three sections. In the first section 20, heat from the expander exhaust gas 24 is exchanged to heat the compressed air 18 as described above by means of a heat exchanger 38. The heat exchanger 38 may comprise a bundle of finned tubes in which the compressed air 18 flows with the expander exhaust 24 flowing on the outside over the finned tube surface. A variety of other heat exchanger designs may be employed, as are known in the art. A bypass, not shown, may also be provided such that the amount of combustion air provided to the heat exchanger 38 may be regulated to control the amount of heat recovered from the expander exhaust gas 24.

In another section 40 of the HRSG 22, the expander exhaust gas 24 flows to a steam generator 42 where it heats and vaporizes boiler feed water 44 entering the steam generator 42 to produce high and/or low pressure steam 46 for appropriate utilization in a plant. Alternatively, or in combination with generating steam, the exhaust gas 24 may be used to heat another heating medium such as oil or another liquid heating fluid. In such an embodiment, an appropriate heat exchange system (not shown) is provided in addition to, or in place of, the steam generator 42 to recover exhaust heat into a liquid heating medium. The amount of cogenerated product (steam or liquid heating medium) produced may be controlled to match plant needs by controlling the flow rate of boiler feed water or liquid heating fluid provided to section 40 of the HRSG 22. Alternatively, production of the cogenerated product or products may be controlled by regulating the flow rate of compressed air conveyed to section 20 of the HRSG 22 and thereby the heat content of the expander exhaust gas entering section 40.

A third section 48 of the HRSG 22 includes heat exchanger 49 which may be used to heat saturator make-up water 50 using the exhaust gas 24, thereby recovering additional exhaust heat and providing greater cycle efficiency improvements. The hot water and/or steam generated may be introduced into the saturator drum 28 through a control valve 52. In one aspect of the invention, the flow rate of make-up water is controlled by a temperature controller 54, which regulates the control valve 52. The controller 54 monitors the temperature of the compressed air exiting the saturator 28 and controls the temperature at a desired set point by adjusting the flow rate of make-up water 50. Temperature controller 54 maintains the temperature of the saturated compressed air at the desired set point by reducing the flow rate of make-up water 50 when the sensed temperature is below the set point and increasing the flow rate of make-up water 50 when the sensed temperature is above the set point. It is desirable to select the temperature set point above the temperature at which condensation may occur in the combustor 30. In this manner, the method allows the maximum amount of water to be added during peak power requirements while preventing the condensation of water in the combustor 30. Because the amount of water that can be safely added depends on the combustion air flow rate and temperature, controlling the make-up water flow as a function of the saturated combustion air temperature enables maximum water addition without risking condensation in the combustor 30.

While it is desirable to add water to the combustion air to increase the rate of gas flow through the turbine 16 for providing additional electric power, water flow to the saturator 28 may also be suspended during periods of low power demand. It will be appreciated, however, that the method of the invention provides substantial operating flexibility to adjust plant operations to power market conditions. Thus, during periods of reduced power demand when prices are low, little or no water may be supplied to the saturator 28. During peak demand periods, water may be supplied up to the condensation limit to boost power production. The make-up water 50 added may be preheated by the HRSG 22 to improve cycle efficiency as described. Alternatively, if more expander exhaust heat is required to heat combustion air or produce the cogenerated products, the make-up water 50 may bypass the HRSG 22.

The invention also encompasses a method in which steam generated in section 40 of HRSG 22 is conveyed to saturator drum 28 to saturate the compressed combustion air 18. In this form of the invention, a valve 56 is provided in a connection from the plant steam header to the inlet piping of saturator drum 28. Temperature controller 54 regulates valve 56 to direct steam to the saturator drum 28 as a function of the sensed saturated combustion air temperature. The temperature controller 54 reduces the steam flow rate when the sensed temperature drops below the desired set point, and increases the steam flow rate when the sensed temperature rises above the desired set point. Thus, if additional power is required and steam production in section 40 of the HRSG 22 exceeds steam demand elsewhere in the plant, it may be desirable to direct steam 46 generated in section 40 of the HRSG 22 to the saturator drum 28 through the valve 56. If additional power is required and the amount of steam produced in section 40 of HRSG 22 matches or is inadequate to meet steam demand elsewhere in the plant, it may be desirable to use make-up water 50 to supply the saturator drum 28 and saturate the compressed air 18.

It will be appreciated that the higher temperature of the combustion air due to heat recovery from the exhaust gas increases the amount of make-up water or steam that can be added to the combustion air during peak power periods without risk of condensation. At the same time, the heat sink requirement is reduced due to the heat recovered in the three sections of the HRSG 22 so that the gas turbine 16 runs efficiently at higher throughput without substantial losses of thermal energy to the atmosphere. Thus, the combination of recovering exhaust thermal energy for the purpose of heating combustion air, make-up water and steam, and adding water or steam to the combustion air, significantly improves the cycle efficiency and economics of cogeneration power plants while enabling larger gas turbines to be installed in cogeneration applications.

In a preferred form of the invention, the fuel flow rate to the combustor 30 is regulated by a temperature controller 58 which controls a valve 60 to maintain the surface temperature of the turbine blades at or below metallurgical limits. This is accomplished by controlling both the fuel flow rate to the combustor 30 and the water rate to the saturator 28.

An important aspect of the present invention is that it allows selection of a gas turbine having a maximum expander exhaust heat load that is greater than the available plant heat sink, thus enabling realization of the increased production efficiencies associated with larger turbines. However, in some market conditions it may be desirable to reduce electric power production by lowering gas turbine throughput. As described more fully below, the apparatus and method of the invention also enables efficient turndown operation of a cogeneration plant when power prices are unfavorable. Such turndown operation may result in an exhaust gas heat load insufficient to meet the steam and/or heating oil requirements of the plant. The HRSG 22 may therefore also be provided with supplemental burners 62 for combusting supplemental fuel 64 and thereby heating the exhaust gas 24 provided to section 40 of the HRSG 22 for generating the cogenerated product or products.

In one embodiment involving cogenerating steam, the flow rate of supplemental fuel to the supplemental burners is regulated by a pressure controller 63 and a valve 68. The pressure controller 63 monitors the pressure of the plant steam header and adjusts the flow of supplemental fuel 64 as necessary to maintain the desired steam pressure. As is known in the art, the steam generator 42 may include means to produce steam of different pressures such as 650 psig. (4583 kPa absolute) high pressure steam and 125 psig. (963 kPa absolute) low pressure steam. The pressure controller 63 may therefore comprise two or more controllers monitoring the different steam headers associated with the overall plant steam system.

The economies of scale of the method and apparatus of the invention are illustrated by Table 1, which compares the power production, heat sink requirement, and efficiency of small and large gas turbines in various heat recovery modes.

TABLE 1

Comparison of Invention with Other Cogeneration and Combined Cycle Processes

| Process No. | Description | Net Power MW | 650 psig Steam 4583 kPa KLB/H | 125 psig Steam 963 kPa KLB/H | Heat Rate BTU/ KW H |
|---|---|---|---|---|---|
| 1 (Process of the invention) | GE 7EA Cogen Recuperative Heater | 85.8 | 185 | 65 | 5990 |
| 2 | GE 7EA Extraction/ Condensing | 101.6 | 185 | 65 | 6800 |
| 3 | GE 7EA Full Cogen (unfired) | 85.8 | 326 | 44 | 6000 |
| 4 | GE 7EA Cogen (high stack temp.) | 85.8 | 185 | 65 | 8060 |
| 5 | GE 7EA Combined Cycle | 124.7 | 0 | 0 | 7800 |
| 6 | GE 6B Full Cogen (unfired) | 40.3 | 155 | 20 | 6400 |

The heat rate for a cogeneration plant should also account for fuel savings associated with the availability of the cogenerated heating medium. In other words, the heat rate is defined as:

Heating value of fuel into gas turbine (BTU/H)-Heating value of fuel saved elsewhere due to availability of cogenerated heating medium (BTU/H)

Net Power (MW)

Thus, for example, if the cogenerated product is steam, there are fuel savings associated with not having to boil as much steam elsewhere in the plant. In a combined cycle plant, there are no fuel savings associated with a cogenerated product.

Process 6 is a cogeneration plant which utilizes a smaller General Electric GE 6B gas turbine sized not to exceed the available plant heating sink. The cogenerated product is high and low pressure steam, and no supplemental fuel is supplied to the HRSG supplemental burners. The heat rate associated with Process 6 compares favorably to three of the other processes, but the net power production is very low. As a result, a greater number of GE 6B turbines are required to meet the total plant power production and the capital investment required is very high.

Process 3 demonstrates the effect of replacing the smaller turbine with a larger advanced GE 7EA gas turbine in a cogeneration plant. The GE 7EA produces more than twice the power at a lower heat rate, but requires a much larger heat sink, as measured by the amount of 650 psig. (4583 kPa absolute) and 125 psig. (963 kPa absolute) steam production. In many plants, this amount of steam is greater than steam consumption elsewhere in the plant such that the heat load of the expander exhaust exceeds the available heat sink.

Process 4 demonstrates the effect of such a heat sink limitation on use of the GE 7EA turbine in a cogeneration plant. Only the portion of the high temperature expander exhaust gas heat required to meet the plant steam requirements is recovered in the HRSG. The remaining exhaust gas heat is vented to the atmosphere resulting in a high exhaust stack temperature. This loss of heat to the atmosphere translates to greater fuel consumption. Thus, in a plant with a heat sink smaller than the maximum exhaust gas heat load, the GE 7EA turbine operates at a much higher heat rate to produce the same net power as Process 3. This high heat rate makes the larger GE 7EA turbine difficult to justify economically because significantly more fuel is required per kilowatt hour of electricity.

Process 1 illustrates the efficiencies associated with use of the recuperative heat recovery method of the invention, as shown in FIG. 1. By recovering expander exhaust gas heat directly into the compressed air to the combustor, the method of the invention provides a low heat rate comparable to cogeneration in a plant with a much larger available heat sink, such as Process 3. However, the exhaust gas has less thermal energy and the required heat sink is much lower, comparable to Process 4. The heat rate is much lower than Process 4 because less heat is lost up the stack to the atmosphere. The larger GE 7EA turbine operated with heat exchanger 70 according to the method of the invention produces more than twice the power of the smaller GE 6B turbine at a lower heat rate and with only a slightly larger heat sink requirement. The heat rate is lower partly because larger turbines experience lower frictional losses in the bearings at higher power outputs. The larger gas turbine is also about 150 /KW less expensive to install than the smaller GE 6B gas turbine because fewer installations are required to meet the total plant power production.

The installation and operating costs of cogeneration plants utilizing the method of the invention also compare favorably to combined cycle plants. Process 5 represents a combined cycle plant with a GE 7EA gas turbine. All of the steam generated by the expander exhaust gas is condensed in a condensing turbine to generate additional electric power. Thus, the net power produced is greater and a heat sink is not required. However, the heat rate of the combined cycle plant is extremely high because only about one third of the exhaust heat is converted to electricity in the condensing steam turbine. The remaining exhaust heat is lost to cooling water in the condensing cycle.

Process 2 represents a heat recovery scheme by which expander exhaust heat is used to generate high and low pressure steam sufficient to satisfy the plant heat sink limitation, and the remaining steam is extracted and condensed in a steam turbine to generate additional power. This process produces more net power, but still has a higher heat rate than Process 1 due to the thermodynamic inefficiencies associated with condensing steam to make power. Thus, the method of the invention produces favorable operating efficiencies for cogeneration compared to combined cycle plants while circumventing available plant heat sink limitations associated with the use of larger gas turbines.

Although not indicated in Table 1, the method of the invention may also involve adding water to the combustion air as shown in FIG. 1 and described above. The rate of water addition is limited in a standard gas turbine because of fear of water condensation. Because the method of the invention increases the combustion air temperature, this constraint is relieved and more water can be added. Adding water in this manner allows for the production of more than 20% of additional peaking power.

Accordingly, the method of the invention not only substantially reduces the heat sink requirement of cogeneration plants, but also significantly increases the cycle efficiency and allows for additional power production when prices are favorable.

TABLE 2

Characteristics of the Invention at Various Loads

|  | Full Load | 90% Load | 85% Load | 80% Load |
|---|---|---|---|---|
| Fuel Required (MBTU/H) | 901.99 | 821.74 | 790.71 | 761.13 |
| Compressor Discharge Temp (F.) | 701 | 637 | 627 | 621 |
| Compressor Flow (KLB/H) | 2318 | 2091 | 2009 | 1936 |
| Expander Exhaust Temp (F.) | 996 | 1029 | 1038 | 1047 |
| Expander Exhaust Flow (KLB/H) | 2412 | 2129 | 2045 | 1972 |
| New Power (MW) | 85.8 | 77.2 | 72.87 | 68.55 |

Table 2 demonstrates another important aspect of the flexibility of operation associated with the method of power production of the invention. Normally, the efficiency of a gas turbine drops when it is turned down from its full capacity. Generally, a gas turbine may be turned down by reducing the air flow to 80% of the base loaded flow. Inlet guide waves provide the flow reduction The fuel flow may be controlled to maintain the surface temperature on the first row of expander blades as described previously. Turning down the plant further requires reducing fuel flow, which lowers the temperature into the expander and lowers the turbine efficiency.

The heat recovery scheme associated with the method of the invention significantly reduces the efficiency loss associated with turndown operation. This is because the heat exchanger 38 actually recovers more heat in the turndown condition. In this regard, it will be appreciated that the pressure drop across the expander 26 decreases as the gas flow rate decreases. The exit pressure of the compressor 14 floats on the expander inlet pressure. As seen in Table 2, as the compressed air flow 18 and expander exhaust flow 24 decrease, the compressor discharge temperature decreases because the amount of compression required to meet the expander inlet pressure has decreased. The expander exhaust temperature increases as the load decreases because the inlet pressure is to the expander is lower and less expansion occurs. These two factors provide a larger driving force for heat transfer (i.e., larger LMTD) and recovery of more heat with the same heat exchange area even though the exhaust flow is lower. Thus, cogeneration power plants utilizing the heat recovery method of the present invention can be turned down when power prices are low (nights when coal is setting the power price for example), without causing as great a loss in efficiency. This gives the cogeneration power producer a more efficient way to reduce power generation when power prices are low. When operating in a turndown condition, additional steam requirements for the site can be met by supplementary firing after the recuperative heater in the supplemental burners 23.

Accordingly, the method and apparatus of the invention substantially lowers the heat sink requirement for gas turbines and thereby enables the cogenerator to take advantage of the increased cycle efficiencies and lower installation cost per kilowatt associated with larger turbines. The invention further permits the cogenerator to optimize plant operations depending on power price levels while satisfying plant heat sink limitations and steam or hot oil requirements. Thus, during normal market conditions, the method of the invention may involve operating the plant base loaded while recovering exhaust heat directly to combustion air so as to not generate more steam or hot oil than the plant requires. During periods of increased power demand and prices, the method may also involve adding water to saturate the combustion air and produce additional peak power without exceeding the available plant heat sink. During periods of low power demand and price levels, the method may involve turning down the gas turbine by reducing air and/or fuel flow rates, which supply supplemental fuel to the supplemental burners if necessary to meet plant steam or hot oil requirements. The method of the invention thus encompasses methods of automatically controlling and adjusting operations as a function of current power market conditions, plant heat sink limitations, and plant steam and hot oil requirements, to thereby improve the economics associated with operating cogeneration power plants.

While the invention has been illustrated and described with reference to specific embodiments, it is to be understood that numerous changes may be made without departing from the spirit and scope of the invention as defined in the following claims.

What is claimed is:

1. A method for generating electric power in a cogeneration power plant which burns a mixture of fuel and air in a combustor and produces a turbine exhaust gas, the method comprising:
   cooling the turbine exhaust gas by exchanging heat with the air prior to conveying the air into the combustor,
   adding water to the combustion air after heat exchange with the turbine exhaust gas and prior to conveying the air into the combustor, and
   further cooling the turbine exhaust gas by using heat therein to produce steam.

2. A method for generating electric power in a cogeneration power plant which burns a mixture of fuel and air in a combustor and produces a turbine exhaust gas, the method comprising:
   cooling the turbine exhaust gas by exchanging heat with the air prior to conveying the air into the combustor,
   adding water to the combustion air after heat exchange with the turbine exhaust gas and prior to conveying the air into the combustor, and
   further cooling the turbine exhaust gas by using heat therein to heat a liquid.

3. In a cogeneration power plant which produces electric power and one or more cogenerated products, a method for reducing the amount of cogenerated product produced per unit of electric power produced, the method comprising:
   providing a gas turbine comprising a compressor section, a combustor section, and an expander section;
   conveying fuel and compressed air to the combustor section;
   combusting said fuel and air in the combustor section to provide heated combustion gas;
   conveying the heated combustion gas to the expander section to produce electric power and expander exhaust gas;
   removing heat from the expander exhaust gas by exchanging heat between the expander exhaust gas and the compressed air prior to flowing the compressed air into the combustor section to provide cooled expander exhaust gas and heated compressed air;
   producing the one or more cogenerated products using heat from the cooled expander exhaust gas, wherein the one or more cogenerated products includes steam;

conveying water to the compressed air prior to conveying the compressed air to the combustor section; and conveying water to the compressed air after the air is heated by the expander exhaust gas.

4. In a cogeneration power plant which produces electric power and one or more cogenerated products, a method for reducing the amount of cogenerated product produced per unit of electric power produced, the method comprising:

providing a gas turbine comprising a compressor section, a combustor section, and an expander section;

conveying fuel and compressed air to the combustor section;

combusting said fuel and air in the combustor section to provide heated combustion gas;

conveying the heated combustion gas to the expander section to produce electric power and expander exhaust gas;

removing heat from the expander exhaust gas by exchanging heat between the expander exhaust gas and the compressed air prior to flowing the compressed air into the combustor section to provide cooled expander exhaust gas and heated compressed air;

producing the one or more cogenerated products using heat from the cooled expander exhaust gas, wherein the one or more cogenerated products includes steam; and conveying water to the compressed air prior to conveying the compressed air to the combustor section, wherein the flow rate of water conveyed to the compressed air is selected based on the temperature of the compressed air conveyed to the combustor section.

5. The method of claim 4 wherein the temperature of the compressed air conveyed to the combustor section is maintained sufficiently high to prevent water condensation.

6. In a cogeneration power plant which produces electric power and one or more cogenerated products, a method for reducing the amount of cogenerated product produced per unit of electric power produced, the method comprising:

providing a gas turbine comprising a compressor section, a combustor section, and an expander section;

conveying fuel and compressed air to the combustor section;

combusting said fuel and air in the combustor section to provide heated combustion gas;

conveying the heated combustion gas to the expander section to produce electric power and expander exhaust gas;

removing heat from the expander exhaust gas by exchanging heat between the expander exhaust gas and the compressed air prior to flowing the compressed air into the combustor section to provide cooled expander exhaust gas and heated compressed air; and producing the one or more cogenerated products using heat from the cooled expander exhaust gas, wherein the one or more cogenerated products includes steam, wherein the flow rate of fuel conveyed to the combustor section is selected based on the temperature of the heated combustion gas at an inlet of the expander section of the gas turbine.

7. The method of claim 6 wherein the gas turbine is operated below its maximum fuel and air throughput.

8. In a cogeneration power plant which produces electric power and one or more cogenerated products, a method for reducing the amount of cogenerated product produced per unit of electric power produced, the method comprising:

providing a gas turbine comprising a compressor section, a combustor section, and an expander section;

conveying fuel and compressed air to the combustor section;

combusting said fuel and air in the combustor section to provide heated combustion gas;

conveying the heated combustion gas to the expander section to produce electric power and expander exhaust gas;

removing heat from the expander exhaust gas by exchanging heat between the expander exhaust gas and the compressed air prior to flowing the compressed air into the combustor section to provide cooled expander exhaust gas and heated compressed air;

producing the one or more cogenerated products using heat from the cooled expander exhaust gas, wherein the one or more cogenerated products includes steam; and conveying water to the compressed air prior to conveying the compressed air to the combustor section, wherein the water is heated by the cooled expander exhaust gas prior to being conveyed to the compressed air, and wherein the flow rate of fuel conveyed to the combustor section is selected based on the temperature of the heated combustion gas at an inlet of the expander section of the gas turbine.

9. The method of claim 8 wherein the gas turbine is operated below its maximum fuel and air throughput.

* * * * *